United States Patent
Bloor et al.

(10) Patent No.: US 6,418,379 B1
(45) Date of Patent: Jul. 9, 2002

(54) METHOD FOR COMPENSATING FOR THE EFFECT OF IRREGULAR SPATIAL SAMPLING AND ILLUMINATION OF REFLECTORS IN SEISMIC EXPLORATION

(75) Inventors: Robert Bloor, Pearland; Uwe Albertin, Houston, both of TX (US)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 09/536,902

(22) Filed: Mar. 28, 2000

Related U.S. Application Data

(60) Provisional application No. 60/127,674, filed on Apr. 2, 1999.

(51) Int. Cl.$^7$ .............................................. G06F 19/00
(52) U.S. Cl. .............................. 702/17; 702/18; 702/14
(58) Field of Search ............................ 702/18, 14, 17; 367/38, 43

(56) References Cited

U.S. PATENT DOCUMENTS

| | | | |
|---|---|---|---|
| 5,206,837 A | | 4/1993 | Beasley et al. ................ 367/38 |
| 5,450,370 A | * | 9/1995 | Beasley et al. ................ 367/53 |

OTHER PUBLICATIONS

Joshua Ronen; *Wave–equation trace interpolation*, Geophysics, vol. 52, No. 7 (Jul. 1987); pp. 973–984, 15 Figs.

James L. Black et al.; *Effect of Irregular Sampling on Prestack DMO*, SP 2.4, pp. 1144–1147.

* cited by examiner

*Primary Examiner*—Edward Lefkowitz
*Assistant Examiner*—Anthony Gutierrez
(74) *Attorney, Agent, or Firm*—Madan, Mossman & Sriram, P.C.

(57) ABSTRACT

This invention provides a method for analyzing and compensating for the deleterious effects of irregular illumination of the subsurface due to velocity variations in the subsurface and of irregular spatial sampling of seismic data. For a processing operator, like Kirchoff migration for seismic data, a conventional migration operation is carried out. The output points are analyzed for sampling artifacts caused by irregular surface sampling of the data and those due to ray path distortions. An inverse sampling operator or a filtering operator is determined that is related to dip dependent attributes at the image location. Application of the inverse sampling operator or filtering operator along with the migration or other processing operator to the seismic data compensates for the effects of irregular sampling and of raypath distortion.

12 Claims, 6 Drawing Sheets

METHOD FOR COMPENSATING FOR THE EFFECT OF IRREGULAR SPATIAL SAMPLING AND ILLUMINATION OF REFLECTORS IN SEISMIC EXPLORATION

CROSS REFERENCES TO RELATED APPLICATIONS

This applications claims priority from U.S. Provisional Patent Application No. 60/127,674 filed on Apr. 2, 1999.

FIELD OF THE INVENTION

This invention relates generally to seismic data processing and more particularly to a method for compensating for the effects of irregular spatial data sampling of seismic wavefields and of irregular illumination of subterranean seismic reflectors by seismic wavefields.

BACKGROUND OF THE INVENTION

In seismic exploration, an acoustic wavefield (a shot) is generated by an acoustic source. The wavefield propagates through the earth from a source location. The wavefield is reflected from earth layers beneath the surface whence it returns to the surface. A plurality of seismic detectors are distributed on or near the surface of the earth, remotely from the source location, along lines of survey or in large areal patches. Preferably, the detectors, which constitute discrete wavefield sampling stations, are uniformly distributed spatially so that the wavefield can be uniformly sampled both areally and temporally. The sampled data are quantized and archivally recorded for further processing.

Fundamental to most of the methods for imaging of subsurface reflections is the movement, or "migration" of the data from the location where they are recorded to the location where the subsurface reflection originates. Kirchoff migration is currently the most commonly used migration algorithm for 3-D prestack depth migration. The Kirchoff integral is based upon a high frequency approximation of the wavefield and is based upon associated traveltime computations. For this reason, it is not able to adequately handle the most complex situations. In any case, the integral is, in prior art applications, evaluated as though the wavefield is regularly sampled. In reality, this is far from being the case for a number of reasons. First, the sampling of the data at the surface is not uniform because of obstructions such as buildings, roads or other culture. In the case of marine exploration, the distribution of receiver locations may be irregular because of errors in the assumed detector locations due to cable drift because of currents and wind or due to the presence of drilling and production platforms. The seismic data are often not only locally under-sampled, they also may be locally excessively densely sampled. A second problem with the evaluation of the Kirchoff integral is that where, as is almost always the case, the velocity of propagation in the subsurface is non-uniform, the illumination of the reflectors by the seismic wavefield is also non-uniform, whereas when the Kirchoff integral is evaluated, the illumination of the reflectors is usually assumed to be uniform.

Well-known seismic processing methods such as stacking, multi-channel filtering, dip moveout correction (DMO), prestack migration, velocity analyses, anisotropy studies, migration and wavefield extrapolation, all assume that the data are uniformly sampled. However, as noted above, the data gathered may be irregularly sampled. That irregularity may be due to obstructions as earlier explained or to missing shots or to inoperative detectors or receivers. When such irregular or inadequately spatially sampled data are not corrected, unwanted computational artifacts may result that are superimposed upon the processed output data.

Wave-equation processing routines such as DMO and movement of data samples, such as by repositioning because of dip migration, can be affected by irregular spatial sampling. In fact, the algorithm meant to improve the output data actually degrades that data because spatial under-sampling or over-sampling leaves remnants of the data-processing operators in the output data. Gross under-sampling, of course may result in dip aliasing. Noise, which is offset-dependent, is only partly canceled out in the stacking operation in the presence of locally-sparse spatial sampling.

In this disclosure, the term "operator" will be used frequently. The term is defined to mean a specific thing involved in a data-processing operation. Thus a DMO operator is a specific expression involved in applying a correction to normal moveout for dip. An operator may be expressed as a symbol indicating an operation to be performed and itself may be the subject of mathematical manipulation.

Various authorities have addressed the problem of locally-sparse spatial wavefield sampling. In a paper entitled "Wave-equation Trace Interpolation", (Geophysics, vol. 52, no. Jul. 7, 1987, pp 973–984) J. Ronen discloses that a processing sequence in which one treats missing data as zero data and performs partial migration before stacking is equivalent to application of the transpose of the stacking operator that actually needs to be inverted. Ronen states that the inverse of the operator cannot be uniquely determined but it can be estimated using spatial spectral balancing in a conjugate-gradient iterative scheme. The first iteration is simply prestack partial migration. Where spatial aliasing is present, several additional iterations are needed.

R. G. Williams et al, in a paper delivered at the 51st annual meeting of the EAEG, May 1989, entitled "Model-constrained Anti-alias Filtering for Improved DMO", apply an anti-alias filter to the data so that the azimuthal under-sampling of the DMO operator can be reduced by use of a dip model for the survey to limit the operator aperture in an azimuth-dependent manner.

In a paper published as expanded abstract no. 1144, at the 59th International Meeting of the SEG, 1989, entitled "Effect of Irregular Sampling on Prestack DMO", J. Black et al. explain that irregular midpoint and azimuthal distributions of the seismic data will cause artifacts in the DMO output if those irregular distributions are ignored. That is said to be especially a problem for pre-stack DMO with land data-collection geometries. Using the actual data-collection geometry, the DMO response can be computed for flat events and can be used to design long wavelength corrections and selective edits that minimize the impact of DMO-induced artifacts. This procedure can be used with any DMO implementation but it is especially relevant for 3-D DMO using the Kirchoff method.

U.S. Pat. No. 5,206,837 issued to Beasley et al. disclose a method based on the decomposition of a seismic-wavefield gather into its constituent dip and source-detector offset components, that accounts for the effect of irregular spatial data sampling by applying an inverse sampling operator to the gather. The method can be applied to any 2-D or 3-D DMO algorithm in a multi-channel wavefield-gathering operation.

In Beasley et al. a wavefield is propagated from a source location. The wavefield is spatially sampled at a plurality of discrete data-sampling stations that are distributed over an area that is remote from the source location. The wavefield samples are combined into a raw gather to which a selected processing operator is applied in a processing step to provide a processed gather. An inverse sampling operator is then applied to the processed gather to provide an equalized wavefield gather. The inverse sampling operator includes the steps of decomposing the processed gather into constituent dip components. The movement and scaling of selected attributes of the components, resulting from the processing step, are analyzed. The movement and scaling of those components are corrected for undesired processing artifacts due to locally, relatively sparse, or relatively dense spatial sampling. In an aspect of this invention, the processing operator may be a form of DMO. While the equalization method in Beasley may be applied to any multichannel data processing regime such as anisotropy studies, filtering operators, migration and wavefield extrapolation, there are no explicit examples of the use of the equalization method to compensate for irregular sampling of the wavefield at the reflecting interfaces due to velocity irregularities.

The present invention shows how the equalization method disclosed in Beasley may be used to correct for irregular sampling of the seismic wavefield due to velocity irregularities, thereby giving an improved Kirchoff migration wherein amplitudes are better preserved.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1A:
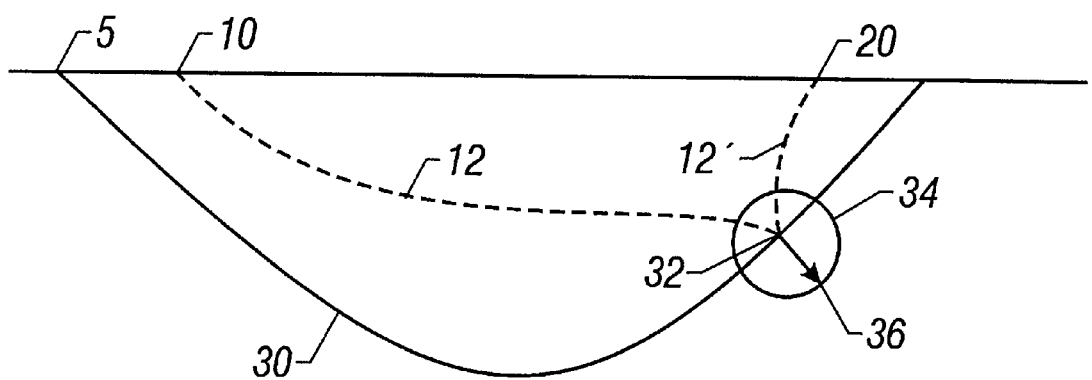
FIG. 1A illustrates a migration operator in variable velocity media.

For the purpose of clarity and explanation, the method of this invention will be described by way of example, but not by way of limitation, with respect to 3D prestack migration of seismic wavefields. It is to be clearly understood that the preferred method may be applied to any multichannel data processing regime such as anisotropy studies, filtering operators, wavefield extrapolation, and DMO processing as earlier mentioned.

Ultimately, the effectiveness of seismic imaging manifests itself in the interplay of acquisition sampling and wavefield distortion as the sound propagates through the earth. In order for a seismic experiment to be successful in imaging a subsurface reflector, the sound reflected from the reflector must arrive with an appreciable amplitude at the receiver. In the high frequency approximation, we can think of the sound propagation and reflection as being approximated roughly by rays that travel through a complex velocity field, and reflect at an imaging point on the reflector via Snell's law. Intuitively, it will only be possible to image the reflector if there are source-receiver pairs in the acquisition geometry for which Snell's law at the reflection point can be satisfied. Now imagine how this manifests itself in a simple Kirchoff imaging algorithm that works by simply spreading and superimposing samples along traveltime isochrons (i.e. migration operators).

Constructive interference occurs when the tangent to the migration operator matches the dip of the reflector at the imaging point, and destructive interference occurs otherwise, resulting in an image of the reflector. If the tangent matches the dip, then rays from source to image point to receiver for this operator essentially satisfy Snell's law at the image point. Within a simple acoustic approximation that neglects transmission losses, three effects now conspire to produce the final image amplitude in the summation process. First, the sound has traveled through a complex velocity field, so its amplitude has dropped according to geometrical spreading. A simple smearing of samples along an isochron followed by a sum may undo much of this effect, but not necessarily in a way that is consistent with a true image of reflectivity. Second, if many source-receiver pairs in the acquisition geometry satisfy Snell's law at the reflection point, one would expect a large amplitude as a result of the constructive interference process. Conversely, if only few satisfy the law, one would expect a drop in amplitude. The result is an amplitude variation in the image of the reflector which is independent of that due to variations in reflectivity: it is a result of how sampling in the acquisition geometry translates to dip sampling at the reflector via complex ray paths. Third and finally is the reflectivity itself, which has an obvious effect on the seismic amplitude. How to undo the interplay between geometrical spreading and effective sampling at the image point to obtain reflectivity alone is far from obvious, but is a key element in maintaining amplitude fidelity in Kirchoff migration.

Recently much progress has been made in the derivation of explicit Kirchoff inversion formulas that solve for reflectivity (Jaramillo, 1998, Bleistein, 1987, and references therein). The inversion formulas that are currently of most interest in large-scale prestack depth imaging are those that properly take into account amplitude and phase factors, but neglect transmission losses and mode conversion. Such an inversion leaves the angle-dependent reflectivity untouched, and is typically referred to as a true-amplitude acoustic inversion.

The effects of discretization are most easily seen by transforming the inversion integrals, which are originally expressed as integrals over a source-receiver configuration at the surface, into integrals over operator dip at the imaging point. In this way the acquisition geometry naturally maps to operator dip at the imaging location in much the same way as was described in our simple Kirchoff summing example above. Significant progress on the effect of dip sampling has been made in the production DMO problem, and much carries over to the inversion problem. One technique that has improved results in the DMO case has been to renormalize amplitudes by the distribution of contributing dips at the output location, a technique referred to as equalization. This was disclosed in the Beasley patent.

Reflectivity can be obtained in a true amplitude inversion by evaluating an integral of the form $$r(x) = \int f(\xi, x) h(\xi, x) d^2 \xi \qquad (1)$$

where $$f(\xi, x) = -\frac{1}{4}\pi^2 \frac{\text{Re}|\bar{p}(x)|}{a_s(\xi, x) a_r(\xi, x)} \frac{\partial}{\partial t} \psi(\xi, t) * \Delta(t)|_{t=ts+tr} \qquad (2)$$

Here, the integration is over a fixed source-receiver configuration at the surface, $$h(\xi, x) = \frac{h_b(\xi, x)}{|\bar{p}(x)|^3} \qquad (3)$$

and $h_b(\xi, x)$ is the Beylkin determinant, $a_{s,r}$ are the source and receiver Green's function amplitudes, and $$\frac{\partial}{\partial t} \psi(\xi, x) * \Delta(t)|_{t=ts+tr}$$

is the derivative of the data convolved with the one-sided delta function, all evaluated at the sum of the traveltimes from the source to the output point and receiver to the output point, and p(x) is the sum of the slowness vectors along the source and receiver rays at the output location.

Although this equation appears daunting, many of the terms have geometrical interpretations. The Green's functions amplitudes may be interpreted as the square root of the ratio of small area elements on the wavefront, one near the source, and the second after the wavefront has traveled to the output location. Similarly, the time derivative term involving the data is essentially the familiar rho filter applied to the data, which is later evaluated at the sum of the traveltimes in the Kirchoff summation process. One of the more interesting factors is the factor h involving the Beylkin determinant.

This factor is conceptually similar to a ratio of small areas in the following way. Consider a point in the source-receiver configuration $\xi$. This may be thought of as defining a seismic trace with a fixed source and receiver position at the surface. Given an output location x there may exist a migration operator, i.e. curve of constant source-receiver traveltime, that passes through the output point. If this migration operator exists, then the normal to the operator at the output location defines a direction, which is essentially the operator dip at that location. Since the dip consists of two angles in three-dimensional space, it can be thought of as defining a point v on a unit sphere. As the point $\xi$ varies, the dip of the operator passing through the point x will vary as well, so a small area in the surface plane around the point maps into to a small area on the unit sphere around the point v. The Beylkin factor h is essentially the ratio of these two areas; it is the Jacobian of the mapping from $\xi$ to v.

This is schematically depicted in FIG. 1A for a variable velocity medium. Shown in cross section is a raypath 12 from a shotpoint 10 on the surface of the earth 5 that after reflection from a reflection point 32 in the subsurface reaches the receiver position 20 as depicted by the raypath 12'. The migration operator 30 is a curve (surface in three dimensions) that is the locus of all such paths 12–12'. This is also a curve (surface) of constant source-receiver traveltime. Also shown in FIG. 1A is a unit sphere 34 centered at the reflection point 32 and a normal 36 to the migration operator 30 at the reflection point. The Kirchoff migrated output at the output location 32 is obtained by integrating the contributions from all possible shot and receiver combinations. In a spatially sampled domain, this integral is approximated by summing over a finite number of shot and receiver pairs. Given a plurality of shot 10 and receiver locations 20, the migrated output at the point 32 is obtained by summing data from all such shot and receiver combinations.

Figure 1B:
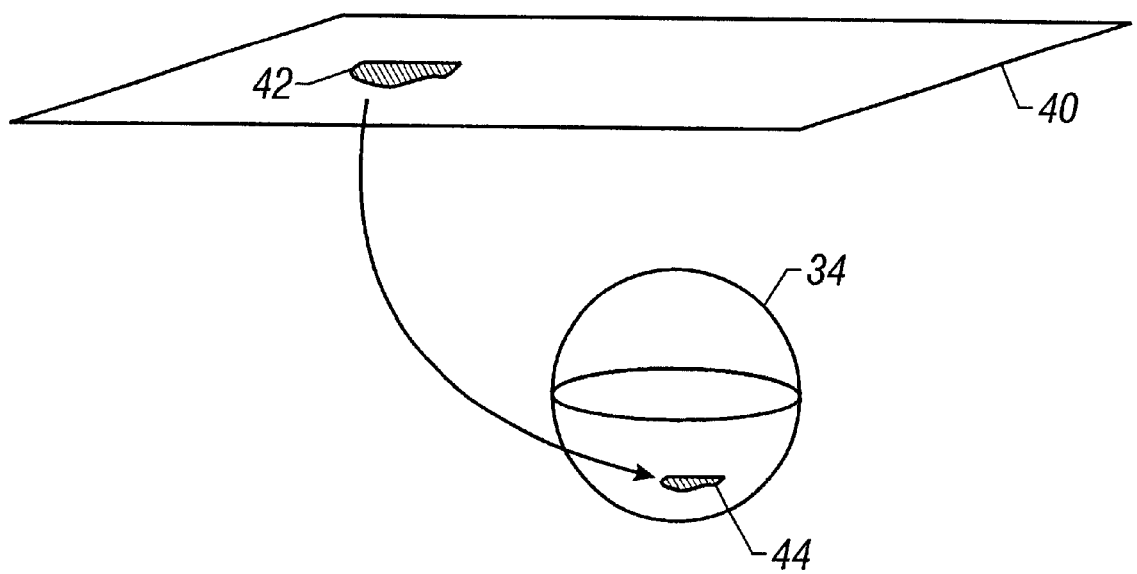
FIG. 1B illustrates the mapping of an area on the recording plane to a solid angle area in the unit sphere at the image point.

To properly perform such a migration, including preservation of amplitudes of the reflection point, the integration should be performed over the unit sphere 34 centered at the output location. In practice, due to a finite aperture of the shot and receiver positions on the recording plane 40 (see FIG. 1B), it is clearly impossible to "cover" the unit sphere. In addition, where there are gaps in the coverage, either with sources or receivers, coverage of the unit sphere 34 is not uniform. This effect has been adequately treated in the Beasley patent. FIG. 1B also shows another source of error due to the bending of the raypaths 12 and 12' (of FIG. 1A) when the velocity distribution in the subsurface is non-uniform. The effect of this is that those points that lie within a small area element 42 on the acquisition plane will map non-uniformly to a region 44 on the unit sphere.

Amplitude preserving migration requires that the Kirchoff integral be carried out over uniform elements on the unit sphere 34. This can be accomplished by defining small elements on the unit sphere that subtend equal solid angles at the reflection point 34. Accordingly, an amplitude preserving migration requires that data gathered over areas on the acquisition plane 40 that correspond to equal solid angles on the unit sphere 34 be given equal weight. This is in contrast to prior art methods in which the integration is performed over small areas on the acquisition plane having sizes $\Delta_x$ and $\Delta_y$ in the x and y directions and summing contributions from these small areas.

Given this graphical representation, the reflectivity equation (1) may be written as $$r(x) = \int f(x, V) d^2 V \qquad (4)$$

where the h term is absent in comparison with equation (1). Discretization of equation (4) gives the result $$r(x) = \sum_i f(\xi, x) h(\xi, x) \Delta^2 \xi_i = \sum_i f(V_i, x) \Delta^2 V \qquad (5)$$

In general, even if the acquisition geometry is regular, the distribution of points $V_i$ on the unit sphere will not be regular, particularly if the velocity field above the output point is complex.

Computation of the summation in eqn. (5) requires computation of the Green's function amplitudes that are part of f. In the present invention, a computation of the Beylkin factor h is not made for reasons given below.

There exist analytic expressions for the Beylkin factor h in terms of Green's function amplitudes for the common shot configuration, but a simple analytic expression in terms of Green's function amplitudes for the common offset case does not exist. However, rather than use an analytic expression for h, it is much simpler in practice to use the following procedure to evaluate the factor. Assume that we fix a given acquisition geometry. If we divide the acquisition plane into sufficiently small bins, then a count can be made of how many samples fall into a given bin. Dividing the count by the size of the bin gives the number of samples in the acquisition geometry per unit area, which we label $n_\xi$. Then, given a small area element $\Delta^2\xi$, the number of samples in this area element is given by $N=n_\xi\Delta^2\xi$. Under the mapping to the unit sphere, these samples map to the area element $\Delta^2v$, so the number of samples per unit area on the unit sphere is $n_v=N/\Delta^2v$. The final reflectivity then becomes $$r(x) = \sum_i f(\xi, x)/n_v(v_i) \tag{6}$$

A notable feature of equation (6) is that it involves only f and the number of samples that map to the unit dip sphere per area for the given acquisition geometry; it does not involve differential areas on the acquisition surface at all, and the Beylkin factor is computed implicitly. Hence no analytic expression for the Beylkin factor is required; all that is required is a division of amplitude by the sample count per area on the unit sphere.

Figure 2A:
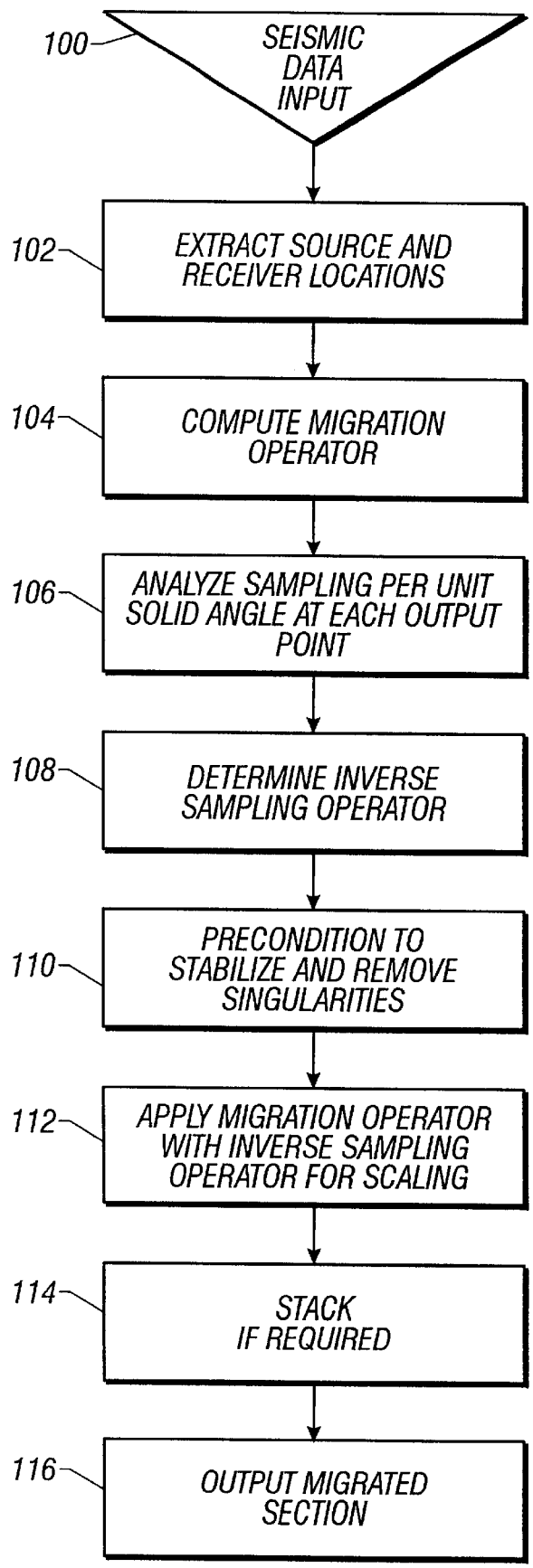
FIG. 2A is a flow diagram illustrative of a computer implementation of the method of this invention when used in applying a prestack migration operator to the data.

FIG. 2A shows the application of the method of the present invention to a data-processing operator such as prestack Kirchoff migration. The raw seismic wavefield input samples are gathered 100 and the source-receiver locations and are identified 102 with respect to the respective wavefield samples to determine source-to-receiver offsets. For a known velocity model of the subsurface, a migration operator is determined 104 for each output point for the appropriate source and receiver geometry. As noted above, the method of the present invention is independent of the shot-receiver geometry, so that the data may be in common shot, common receiver, common offset, or any other suitable gather.

For each output point, the sampling of the data is analyzed in terms of samples per unit solid angle 106. For computational purposes, an approximation is made in the determination of the sample density per unit solid angle: first, the unit sphere is divided into segments based upon sampling in dip and in azimuth and a density for these segments is computed. These values are then corrected by an appropriate trigonometric factor to convert the density values to a density per unit solid angle.

A corresponding inverse sampling operator is determined 108. A conditioning operation is applied to remove any singularities, i.e., null values due to locally inadequate spatial sampling. The migration operator together with the inverse sampling operator is applied to the seismic data 112. This produces migrated data with an amplitude correction so as to compensate for the effect of non-uniform illumination. An optional stacking operation is applied 114 and the migrated section is produced. This optional stacking is performed if a number of partial images are produced by the processing of the data at 112 and improves the signal to noise ratio of the output section.

Reflectors in the subsurface can be imaged because seismic energy has reflected from them. In some cases a location in the subsurface may be poorly imaged because the source-receiver position acquisition geometry and the subsurface velocity structure are such that little or no seismic energy reflect from an output location. This problem is often referred to as an illumination problem, i.e., the subsurface location (output position) is poorly illuminated. In order to understand such problems the illumination attributes can be evaluated given a source-receiver position acquisition geometry and a velocity model. For example, the illumination attribute of sample density per unit solid angle may be displayed to determine which output locations are likely to be susceptible to noise problems due to variations with reflector dip in the illumination. Normally illumination analysis has been achieved in the prior art by raytracing from the specific geometry into the subsurface and analyzing the quantity of rays reflecting from specific subsurface reflectors. However, while raytracing will show the density of coverage at a reflector, raytracing would be impractical for analyzing all possible reflectors, all possible illuminated dips and all output locations as the present invention does.

By examining the illumination of all dips at output positions we can understand if we are susceptible to emphasizing coherent noise at the cost of real subsurface structure. Hence given some understanding of the subsurface velocity structure we can assess acquisition geometries and what kind of sampling related illumination attributes and potential noise problems are then going to occur for all output positions. Raytracing can be used for analysis only where reflectors are coincident with output locations. The present invention can be practically utilized for illumination analysis for all subsurface dip dependent output location attributes. Any subsurface output positions' susceptibility to sampling related noise problems will often be apparent by examining the displayed dip dependent output location attribute illumination characteristics, such as sample density per unit solid angle, at output points. This sample density information may be combined for display with other illumination attributes related to acquisition geometry and velocity structure.

Figure 2B:
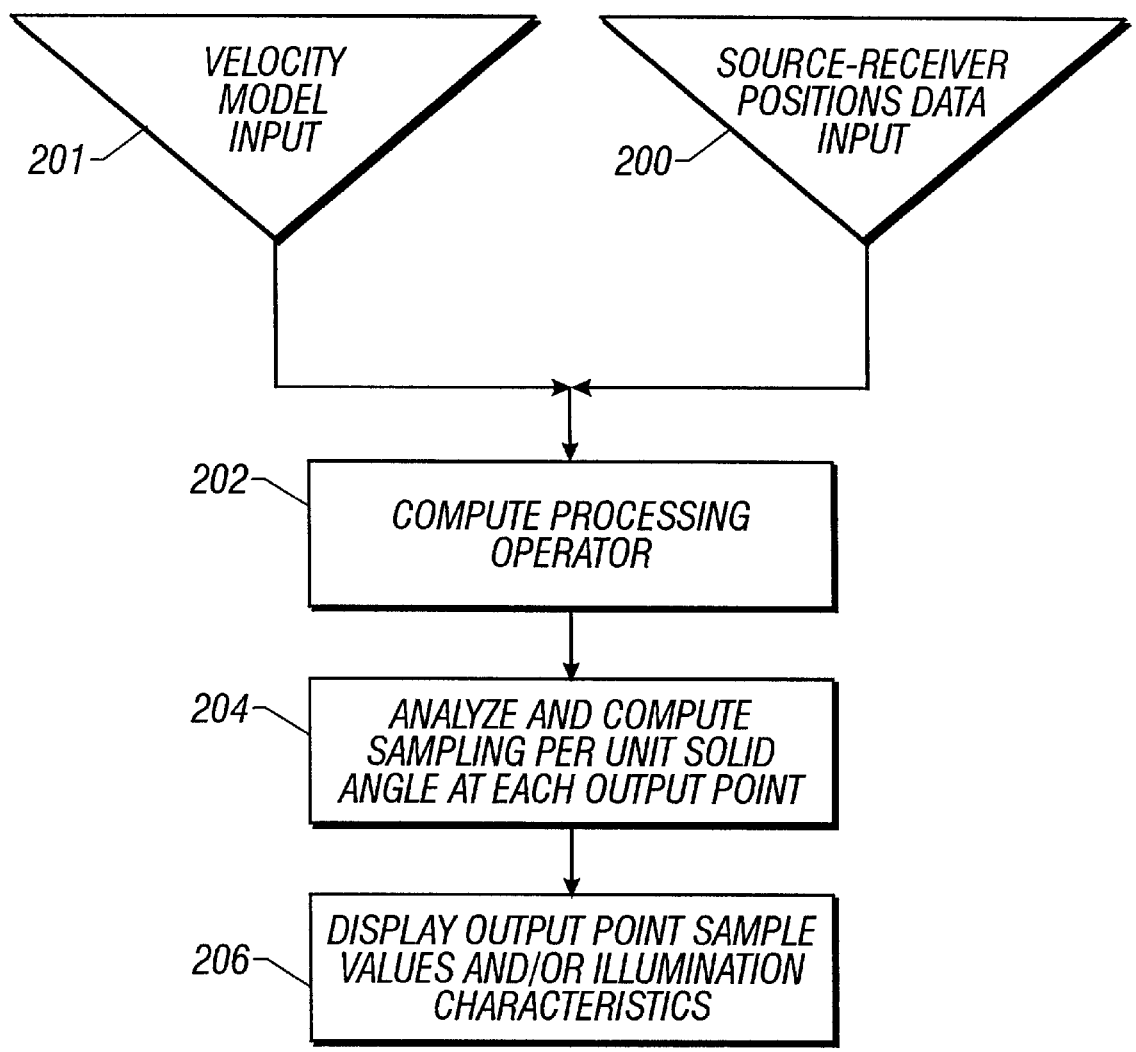
FIG. 2B is a flow diagram illustrative of a computer implementation of the method of this invention when used in examining the subsurface output position illumination attributes and potential problems based on source-receiver acquisition geometry with a known velocity structure.

FIG. 2B shows the method of the present invention applied to the examination of how subsurface reflectors, structures and other features will be illuminated. For the source-receiver geometry 200 and a velocity model of the subsurface 201 a processing operator is computed 202, for instance, a Kirchoff Migration operator. The illumination characteristics may then be computed at each output point 204 and displayed 206. The displayed characteristics will show to practitioners versed in the art how well or how poorly subsurface features may be illuminated and what kinds of noise problems may interfere with the subsurface illumination, and what dips may have noise problems.

The application of equalized depth migration, as described in FIG. 2A can be considered as a generalized dip dependent filtering mechanism controlled by the illumination. Alternatively, this filtering aspect of the present invention may be directed, or biased, to enhance or suppress aspects of the subsurface illumination the practitioner desires. This is achieved by adjusting the weighting at a subsurface output location for a specific dip in order to strengthen or weaken the amplitude at that dip in the final image. The dips that are affected can vary from output location to output location, and may depend on how the practitioner wants to bias the imaging. For instance, in addition to equalizing signal contributions from all dip angles present at any output location, the data at any image point output location may be biased based on the subsurface velocity structure, the geologic structure, any dominant energy characteristics, or exactly which dip angles the practitioner chooses to enhance or suppress.

Figure 2C:
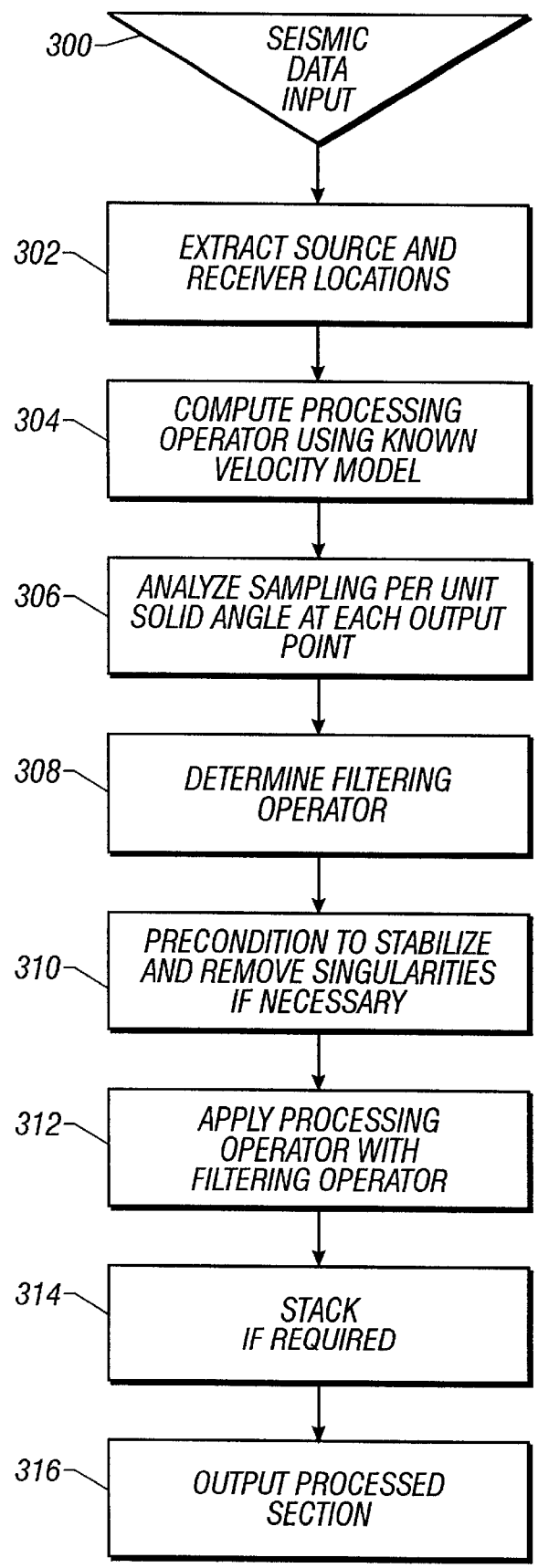
FIG. 2C is a flow diagram illustrative of a computer implementation of the method of this invention when used in applying a filter based on this invention with a processing operator like a migration operator.

FIG. 2C shows the application of the method of the present invention to a data-processing operator combined with a filter to enhance or suppress chosen data aspects. The raw seismic wavefield input samples 300 are gathered and the source-receiver locations 302 are identified with respect to the respective wavefield samples to determine source-to-receiver offsets. For a known velocity model of the subsurface, a processing operator (for instance a Kirchoff migration operator) is determined 304 for each output point for the appropriate source-receiver geometries.

For each output point, the sampling of the data is analyzed in terms of samples per unit solid angle 306 as explained in reference to FIG. 2A above. A filtering operator is then chosen 308 that will enhance or suppress data at dips desired by the practitioner. A conditioning operation 310 is applied to remove any singularities if the filter or data is not already well conditioned. The processing operator and this filtering operator are applied 312 to the seismic data. This produces processed seismic data with enhanced and/or suppressed illumination attributes. Optional stacking of the other processed data gathers 314 may be performed which may improve the signal to noise ratio of the output processed section.

Figure 3A:
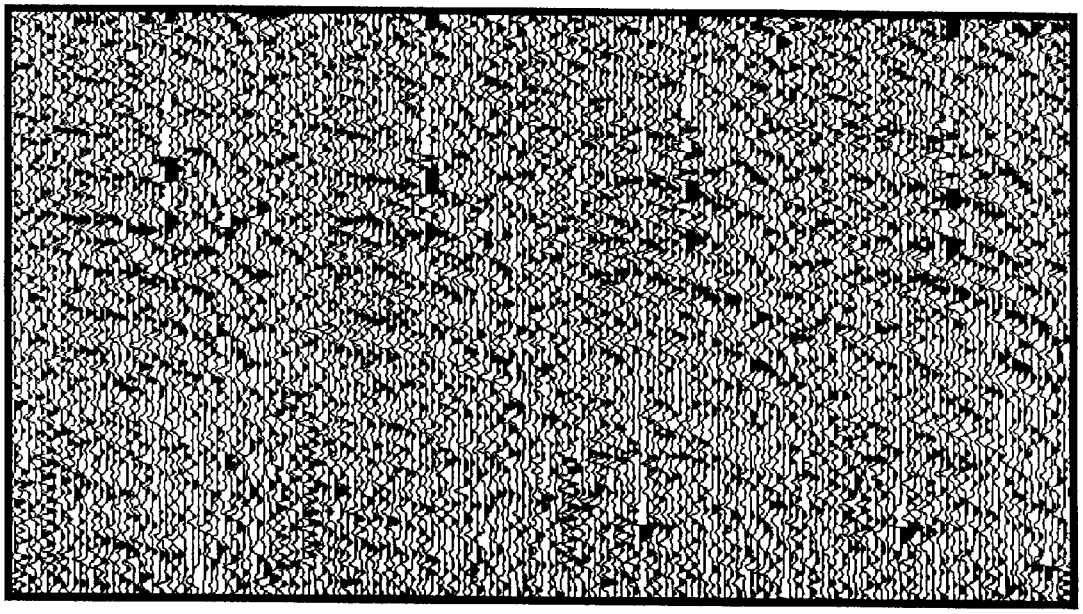
FIG. 3A and FIG. 3B show a comparison of prestack depth migrated image gathers for an irregular subsurface coverage geometry without equalization (FIG. 3A) and with equalization (FIG. 3B) of the amplitudes using this invention.
Figure 3B:
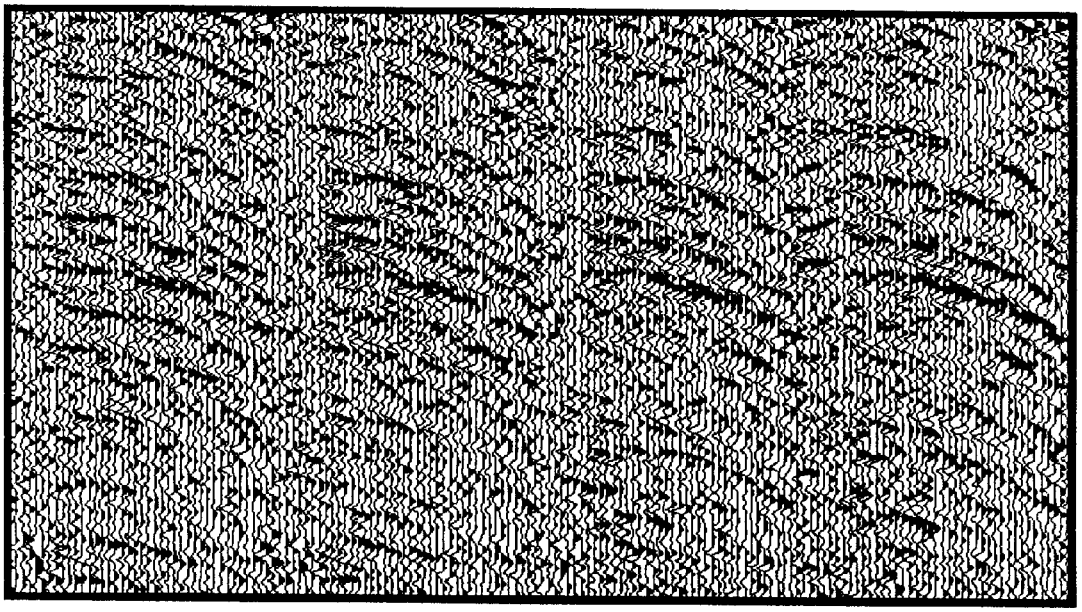

The data for FIG. 3A were acquired along a plurality of radial and circumferential seismic survey lines. These data have an offset range of 3000 to 3200 feet and the density of areal coverage is irregular. FIG. 3A shows the result of Kirchoff migration of the acquired data within this offset range using prior art methods. Shown are four separate migrated common midpoint (CMP) gathers. FIG. 3B shows the same four migrated CMP gathers using a Kirchoff migration with the amplitude correction of the present invention following the method outlined in FIG. 2A. The improvement in the migration is apparent in an improved amplitude behavior from one offset to another and a more continuous image.

Figure 4A:
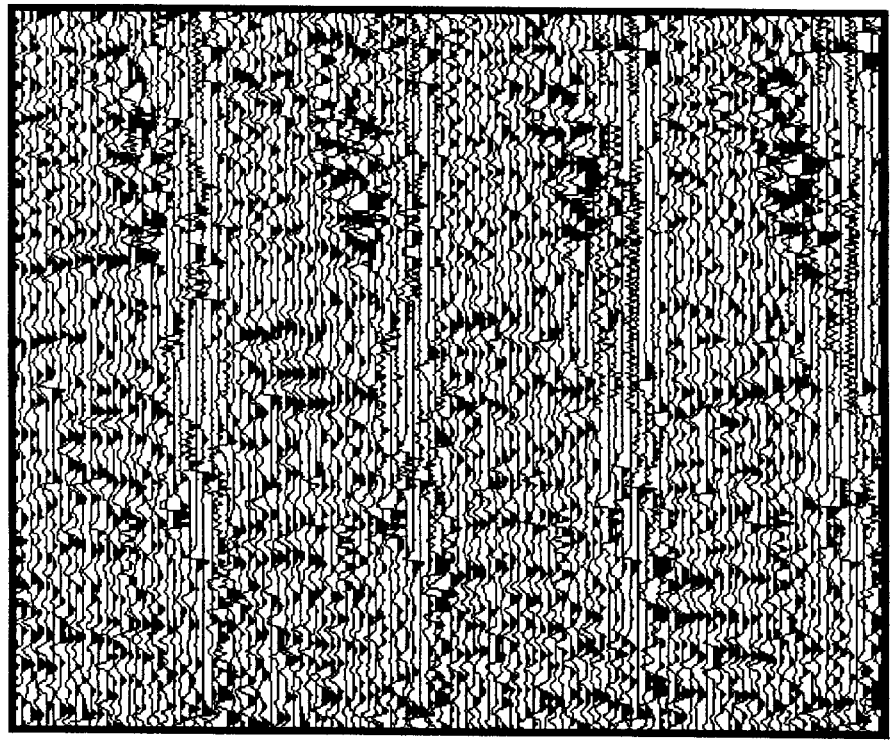
FIG. 4A illustrates a data gather showing amplitudes without equalization in the proximity of a salt body.
Figure 4B:
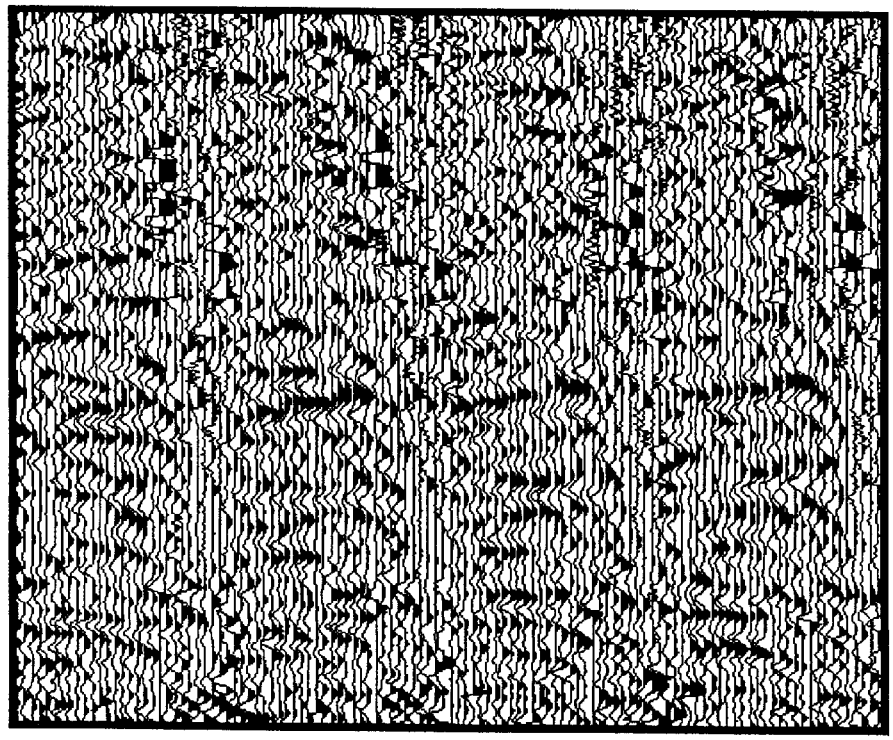
FIG. 4B illustrates the result of equalization of the amplitudes for migration of data from FIG. 4A in the proximity of a salt body.

FIG. 4A shows data using conventional Kirchoff migration obtained at a location where there are no serious irregularities in the surface sampling of the data. However, the geologic section here includes a salt layer that produces serious distortions in the wavefields due to a large velocity contrast with adjacent sediments. FIG. 4B shows the migration obtained using the present invention and compensating for the non-uniform illumination of the subsurface due to velocity variations therein.

This invention has been described with particular application to Kirchoff migration by way of example but not by way of limitation. As noted above, the invention is a generalization of the equalization method disclosed in the Beasley patent for DMO operations. The concepts developed herein can apply to any multichannel wavefield gathering or processing method such as to more exotic DMO operators designed to handle velocity analyses, anisotropy, filtering and other processes dealing with migration and wavefield extrapolation. This invention is in no way restricted to any specific type Kirchoff migration and is limited only by the appended claims.

What is claimed is:

1. A method for processing seismic wavefields propagated from a source location, comprising:
   (a) spatially sampling said wavefield at a preselected plurality of discrete sampling stations distributed over an area remotely from said source location;
   (b) combining the wavefield samples into a raw wavefield input gather;
   (c) for a selected processing operator, determining a number of samples per unit solid angle of the processed gather at a plurality of output positions thereby giving a plurality of sample density values,
   (d) determining an inverse scaling operator for the plurality of output positions; and
   (e) applying the selected processing operator and the inverse scaling operator to the raw wavefield input gather and producing a seismic section at the plurality of output positions.

2. The method as defined by claim 1, wherein the processing operator is a Kirchoff migration operator.

3. The method as defined by claim 1, wherein determining the inverse scaling operator further comprises enhancing or suppressing seismic data at output positions for predetermined dips related to said sample density values.

4. The method as defined by claim 3, wherein suppressing or enhancing seismic data at output positions for predetermined dips is based upon at least one of the following:
   (i) based on equalizing seismic data at all output position dip angles; or
   (ii) based on equalizing seismic data at all output position dip angles where data exist; or
   (iii) based on subsurface velocity structure; or
   (iv) based on subsurface geological structure; or
   (v) based on dominant energy dip characteristics; or
   (vi) based on predetermined signal energy characteristics; or
   (vii) based on predetermined noise energy characteristics.

5. A method for compensating for the effect of irregular illumination of subsurface reflectors in a multichannel seismic survey, comprising:
   (a) propagating a seismic wavefield from a source location using a source thereof;
   (b) spatially sampling said wavefield at a preselected plurality of discrete sampling stations distributed over an area remote from said source location;
   (c) combining the wavefield samples in a raw wavefield gather;
   (d) computing, for a selected processing operator, a sampling operator that relates the spatial sampling at said discrete plurality of sampling stations to a local sampling related to said irregular illumination at a plurality of image points; and
   (e) applying an inverse sampling operator and the selected processing operator to said raw wavefield gather to produce a processed gather that is compensated for irregular illumination.

6. The method as defined by claim 5, wherein the processing operator is a Kirchoff migration operator.

7. A method for analyzing the illumination attributes of subsurface output points due to a source location in a multichannel seismic survey, comprising:
   (a) for a selected plurality of discrete sampling stations distributed remotely from said source and a known velocity field in the subsurface, determining at least one dip dependent output location attribute of a data gather to be processed at a plurality of output positions thereby giving a plurality of dip dependent output location values for a selected processing operator;
   (b) deriving illumination attributes from said dip dependent output location values, discrete sampling station acquisition geometries and the subsurface velocity field;
   (c) combining and displaying the illumination attributes at a plurality of output positions.

8. The method as defined by claim 7, wherein the dip dependent output position attribute is sample density per unit solid angle.

9. The method as defined by claim 7, wherein the processing operator is a Kirchoff migration operator.

10. A method of filtering seismic data for the illumination of subsurface structure in a multichannel seismic survey, comprising:

(a) propagating a seismic wavefield from a source location using a source thereof;

(b) spatially sampling said wavefield at a preselected plurality of discrete sampling stations distributed over an area remote from said source location;

(c) combining the wavefield samples in a raw wavefield gather;

(d) computing, for a selected processing operator, a filtering sampling operator that relates the spatial sampling per unit solid angle at said discrete plurality of sampling stations to a predetermined bias function thereby emphasizing or suppressing illumination at various dips;

(e) applying the computed filtering operator and the selected processing operator to said raw wavefield gather to produce a processed gather that enhances or suppresses illumination characteristics.

11. The method as defined by claim 10, wherein computing the filtering operator further comprises enhancing or suppressing seismic data at output positions for dips based on a predetermined bias function based on at least one of the following;

(i) based on equalizing seismic data at all output position dip angles; or (ii) based on equalizing seismic data at all output position dip angles where data exist; or (iii) based on subsurface velocity structure; or (iv) based on subsurface geological structure; or (v) based on dominant energy dip characteristics; or (vi) based on predetermined signal energy characteristics; or (vii) based on predetermined noise energy characteristics.

12. The method as defined by claim 10, wherein the processing operator is a Kirchoff migration operator.

* * * * *